(12) United States Patent
Jolly et al.

(10) Patent No.: US 6,674,593 B2
(45) Date of Patent: Jan. 6, 2004

(54) METHOD AND APPARATUS FOR WRITING A SERVO TRACK TO A STORAGE MEDIUM

(75) Inventors: Paul H. R. Jolly, Fareham (GB); Paul A. Levin, Manhattan Beach, CA (US)

(73) Assignee: Xyratex Technology Limited, Havant (GB)

(*) Notice: Subject to any disclaimer, the term of this patent is extended or adjusted under 35 U.S.C. 154(b) by 318 days.

(21) Appl. No.: 09/796,435

(22) Filed: Mar. 2, 2001

(65) Prior Publication Data

US 2001/0033448 A1 Oct. 25, 2001

Related U.S. Application Data

(60) Provisional application No. 60/187,033, filed on Mar. 6, 2000.

(51) Int. Cl.[7] .................. G11B 5/09; G11B 21/02; G11B 5/596
(52) U.S. Cl. .................. 360/51; 360/75; 360/77.08
(58) Field of Search .................. 360/51, 75, 77.08

(56) References Cited

U.S. PATENT DOCUMENTS

| | | | |
|---|---|---|---|
| 5,666,547 A | | 9/1997 | James et al. .................. 710/58 |
| 5,796,541 A | * | 8/1998 | Stein et al. .................. 360/75 |
| 6,064,541 A | * | 5/2000 | Sasamoto et al. .......... 360/77.05 |
| 6,522,488 B2 | * | 2/2003 | Sasamoto et al. ............. 360/31 |
| 2002/0048107 A1 | * | 4/2002 | Bryant et al. ................. 360/51 |

FOREIGN PATENT DOCUMENTS

WO  WO-A-98/31015   1/1998

OTHER PUBLICATIONS

Wu et al., "A 900–MHz/1.8–GHz CMOS Receiver for Dual–Band Applications," 33(12):2178–2185 IEEE Journal of Solid–State Circuits (Dec. 1998).
Itoh et al., "2.1GHz Direct–Conversion GaAs Quadrature Molulator IC for W–CDMA Base Station," 1999 IEEE International Solid–State Circuits Conference, 0–708–5129–0/99.
Rohde, "RF and Microwave Digital Frequency Synthesizers: Theory and Design," pp. 172, 175–177. (1997).
Schwartz, "Information Transmission, Modulation, and Noise," pp. 224–227 and 252. (1980).
"Motorala MECL Integrated Circuits," Fifth Edition, pp. 6–44, 6–45. (1993).
"Regenerative Clock Technique for Servo Track Writers," 33(5):310–311 IBM Technical Disclosure Bulletin (Oct. 1, 1990), XP000107544 ISSN: 0018–8689.
Sam, "Hybrid Frequency Synthesizer Combines Octave Tuning Range and Millihertz Steps," 11(5):76–84 Applied Microwave & Wireless (May 1999).

\* cited by examiner

*Primary Examiner*—Regina N. Holder
(74) *Attorney, Agent, or Firm*—Pillsbury Winthrop LLP

(57) ABSTRACT

A clocking method and apparatus for a rotating storage medium uses a single reference frequency from which both the pattern frequency of a servo pattern signal and the rotational frequency of the storage medium are derived. During the servo track writing process, a clock track is read from the storage medium to obtain a clock signal having a clock frequency and the phase of the servo pattern signal is digitally adjusted relative to the clock signal so that the servo pattern signal is in phase with the clock signal.

30 Claims, 3 Drawing Sheets

METHOD AND APPARATUS FOR WRITING A SERVO TRACK TO A STORAGE MEDIUM

This application claims the benefit of U.S. Provisional Application No. 60/187,033, filed Mar. 6, 2000.

The present invention relates to a method and apparatus for writing a servo track on a storage medium.

Information for systems such as data processing systems is typically stored on storage media. Particular use is made of storage disks such as magnetic disks, opto-magnetic disks, and the like. One type of magnetic disk arrangement is a so-called "head disk assembly" which is intended normally to be permanently fixed in a data processing system; the head disk assembly includes the magnetic disk medium itself and the associated read and write head or heads which write data to the disk and read data from the disk. Another type of magnetic disk is of a type known as "removable media" which normally consists of a magnetic disk medium in a protective plastics case which can be used to transfer data between data processing systems by physical transfer of the disk itself from one machine to another.

In a known method of manufacturing storage media such as hard disk drives, a head disk assembly consisting of the head(s), the disk or disks, the motor and arm electronics, is mounted in a mastering station known as a servo-writer. The servo-writer writes a pattern of magnetic information (the "servo track pattern") onto the disk. The servo track pattern becomes the master reference which is used by the disk drive during normal operation in order to locate the tracks and sectors on the disk for data storage and retrieval.

In order to be able to write the servo tracks onto the correct positions on the disk during manufacture of the disk, in one commonly used process, a (usually temporary) clock track is written onto the disk to serve as a timing reference during writing of the servo pattern. Conventionally, a separate clock head is used to write the clock track onto the disk and to read the clock track from the disk so that the servo tracks can be phase aligned with respect to each other. However, the use of a dedicated clock track writing head is an expensive addition to the manufacturing process and further requires that the servo tracks be written in a clean room because the clock track writing head has to be inserted into the open (unsealed) head disk assembly. Moreover, in practice the clock heads have to be replaced on a daily basis because of damage which occurs during use.

U.S. Pat. No. 5,485,322 discloses a method and system for writing a clock track on a storage medium using an internal recording head of a hard disk drive. A timing pattern is generated on the storage medium with the internal recording head and a radial positioning value used in radially positioning the internal recording head is determined. The servo pattern is written at the locations determined by the generated timing pattern and radial positioning value. In effect, in this prior art system, the clock pattern is written in an iterative manner across the disk. However, there is a problem in that this method can introduce phase and frequency differences in a clock pattern between respective tracks on the disk. As a disk will often require many thousands of clock tracks across the disk, even very small phase and frequency errors in the clock track can cumulatively become very large.

U.S. Pat. No. 5,448,429 discloses another example of a system for writing clock tracks across a disk in which a written clock signal is read to provide a reference for the writing of the clock signal to a subsequent track.

U.S. Pat. No. 5,668,679 discloses another example of a method of self-servowriting a disk drive in which a clock track is written followed by spiral tracks across the disk. The clock track and the spiral tracks have missing pulses or bits and are used to locate the arm of the disk drive when the servo information is written.

In our WO-A-98/31015, the entire disclosure of which is incorporated herein by reference, there is disclosed a method and apparatus for writing clock data to a storage medium, such as a disk. The storage medium has tracks on which data can be stored. Clock data is written to a present track on the storage medium. The written clock data is read from that track. Clock data for a subsequent track on the storage medium is generated from the clock data read from said present track. The phase of the generated clock data for the subsequent track is compared with a reference timing signal and the phase of the generated clock data for the subsequent track is adjusted in accordance with said comparison. The phase adjusted clock data for the subsequent track is then written to said subsequent track. In this method and apparatus, it is again not necessary to provide a dedicated clock read/write head. As in other proposals of this type, the servo information is written to the disk using the clock track data to position the servo information very accurately. To save time, it is preferred that the servo information in a track be written alternately with the clock data in that track, i.e. in any track, a portion of clock data is written, that clock data being phase aligned with the clock data in the previous track, and then a burst of servo data is written, again appropriately phase aligned with the previous track, followed by the next portion of clock data, and so on.

However, there are a number of problems associated with using an analogue phase locked loop in a servo track writer. For example, analogue phase locked loops are extremely noise sensitive and the quality of the frequency and phase lock is difficult to determine exactly. If there is a defect on the disk where the clock track is written, analogue phase locked loops respond unfavourably to the disturbance. If the analogue signal detected through the clock head is disturbed by noise, then there is again an unfavourable response in the phase locked loop circuit. Conventional analogue phase locked loops are sometimes used in a servo track writer during the actual writing of the servo tracks in a mode in which they are not phase locked, but remain locked at the last detected frequency and phase, but this means that inevitably the loop is locked at that last frequency and phase. The analogue phase locked loop is also prone to drift and other inaccuracies in this hold mode. Also, analogue phase locked loop circuits induce errors not only into the phase but also the frequency when used in this locked mode because the last detected frequency is in principle not known. This means that analogue phase locked loops are difficult to use in a system in which one clock track is generated from a previous clock track. Finally, analogue phase locked loops require tuning to different operating frequencies due to the stability and control issues of such devices.

A further problem with the prior art is that the only connection between the two states, frequency and phase, of the servo tracks to be written and the frequency and phase of the clock track with which phase alignment is to be achieved is by means of the analogue phase locked loop, but phase and frequency are inextricably linked in an analogue phase locked loop. This makes it difficult to achieve phase alignment and frequency coherence, especially at high frequencies.

According to a first aspect of the present invention, there is provided a method of writing a servo track to a storage medium having at least one clock track thereon which is used to control the phase of the servo track written to the storage medium, the method comprising the steps of:

rotating a storage medium at a rotational frequency which is obtained from a reference frequency;

obtaining a servo pattern signal having a pattern frequency from said reference frequency;

reading a clock track from said storage medium to obtain a clock signal having a clock frequency;

adjusting the phase of the servo pattern signal relative to the clock signal so that the servo pattern signal is in phase with the clock signal; and, writing a servo track in accordance with the servo pattern signal to the storage medium.

The motor frequency and the pattern frequency are both obtained from the same reference frequency. This greatly facilitates the achievement of frequency coherence between the clock track on the storage medium and the servo track, especially at high frequencies. The pattern frequency is in the preferred embodiment bounded to be very close to or equal to the reference frequency. The motor frequency tracks the reference frequency as accurately as possible, typically within a fraction of a percent. The maintenance of frequency coherence and of phase coherence are separated in this aspect of the invention. In the preferred embodiment, phase coherence is maintained by a phase locked loop and the reference frequency, and frequency coherence is maintained by the motor speed. The reference frequency is preferably obtained from a crystal oscillator.

The phase of the servo pattern signal is preferably digitally adjusted relative to the clock signal so that the servo pattern signal is in phase with the clock signal. The use of digital adjustment overcomes all of the problems associated with the particular use of an analogue phase locked loop experienced in the prior art. Two particular advantages are that the pattern frequency is well defined and the absolute phase of the servo pattern signal relative to the reference frequency is well defined.

The method may include the step of switching the pattern frequency between one of a plurality of discrete values thereby to adjust the phase of the servo pattern signal relative to the clock signal. Thus, the frequency of the pattern can be well bounded and very close to the intended and, in a clock copy scheme, the frequency of the track being written is not determined by the previous track and therefore does not rely on the previous track.

A digital phase locked loop is preferably used to adjust the phase of the servo pattern signal relative to the clock signal. The digital phase locked loop may include a dual-modulus prescalar, and the method may comprise the step of operating the dual-modulus prescalar to adjust the phase of the servo pattern signal relative to the clock signal.

The servo pattern signal may alternatively be obtained by the steps of passing the reference signal to two amplifiers the outputs of which are separated or shifted in phase relative to each other and summing said outputs, and the method may comprise the step of adjusting the phase of said servo pattern signal by adjusting the gain of at least one of the amplifiers. As will be discussed further below, in an example, this allows extremely small phase adjustment steps to be achieved, allowing operation of the method at very high frequencies.

According to a second aspect of the present invention, there is provided a method of writing a servo track to a storage medium having at least one clock track thereon which is used to control the phase of the servo track written to the storage medium, the method comprising the steps of:

generating a servo pattern signal having a pattern frequency; and, reading a clock track from said storage medium to obtain a clock signal having a clock frequency;

digitally adjusting the phase of the servo pattern signal relative to the clock signal so that the servo pattern signal is in phase with the clock signal; and, writing a servo track in accordance with the servo pattern signal to the storage medium.

As mentioned above, the use of digital adjustment overcomes all of the problems associated with the particular use of an analogue phase locked loop experienced in the prior art. The maintenance of frequency coherence and of phase coherence are separated in this aspect of the invention. In the preferred embodiment, phase coherence is maintained by a phase locked loop and a reference frequency, and frequency coherence is maintained by the motor speed.

The method may comprise the step of switching the pattern frequency between one of a plurality of discrete values thereby to adjust the phase of the servo pattern signal relative to the clock signal.

A digital phase locked loop may be used to adjust the phase of the servo pattern signal relative to the clock signal. The digital phase locked loop may include a dual-modulus prescalar, and the method may comprise the step of operating the dual-modulus prescalar to adjust the phase of the servo pattern signal relative to the clock signal.

The servo pattern signal may be obtained by the steps of passing the reference signal to two amplifiers the outputs of which are separated or shifted in phase relative to each other and summing said phase separated outputs, and the method may comprise the step of adjusting the phase of said servo pattern signal by adjusting the gain of at least one of the amplifiers.

According to a third aspect of the present invention, there is provided a method of writing a servo track to a storage medium having at least one clock track thereon which is used to control the phase of the servo track written to the storage medium, the method comprising the steps of:

generating a servo pattern signal having a pattern frequency from a reference signal by passing the reference signal to two amplifiers the outputs of which are separated or shifted in phase relative to each other and summing said outputs, the summed output being used to generate the servo pattern signal;

reading a clock track from said storage medium to obtain a clock signal having a clock frequency;

adjusting the phase of the servo pattern signal relative to the clock signal so that the servo pattern signal is in phase with the clock signal by adjusting the gain of at least one of the amplifiers; and, writing a servo track in accordance with the servo pattern signal to the storage medium.

As mentioned above and as will be discussed in more detail below, this allows extremely small phase adjustment steps to be achieved, allowing operation of the method at very high frequencies.

The gain of the amplifiers is preferably digitally controllable.

The phase by which the outputs of the amplifiers are separated or shifted relative to each other is preferably 90°.

According to a fourth aspect of the present invention, there is provided apparatus for writing a servo track to a storage medium having at least one clock track thereon which is used to control the phase of the servo track written to the storage medium, the apparatus comprising:

a source of a reference signal having a reference frequency;

a drive circuit arranged to cause rotation of the storage medium at a rotational frequency which is obtained from the reference frequency;

a servo pattern signal generator arranged to receive the reference frequency and to output a servo pattern signal having a pattern frequency obtained from the reference frequency for use in writing a servo track on said storage medium; and, a phase adjuster for adjusting the phase of the servo pattern signal to be in phase with a clock signal obtained from a clock track on a said storage medium.

Said phase adjuster is preferably a digital phase adjuster. The digital phase adjuster may be arranged to adjust the phase of the servo pattern signal relative to the clock signal by switching the pattern frequency between one of a plurality of discrete values.

Said phase adjuster may be a digital phase locked loop. The digital phase locked loop may include a dual-modulus prescalar. Said dual-modulus prescalar may also form part of the servo pattern signal generator.

The phase adjuster may alternatively comprise two amplifiers, a phase separator or shifter for separating or shifting the outputs of the amplifiers in phase relative to each other, a summer for summing said phase separated outputs, and a gain controller for adjusting the gain of at least one of the amplifiers thereby to adjust the phase of said servo pattern signal.

The first frequency converter may comprises a dual-modulus prescalar.

According to a fifth aspect of the present invention, there is provided apparatus for writing a servo track to a storage medium having at least one clock track thereon which is used to control the phase of the servo track written to the storage medium, the apparatus comprising:

a servo pattern signal generator for generating a servo pattern signal having a pattern frequency;

a clock track reader for reading a clock track from a storage medium to obtain a clock signal having a clock frequency; and, a digital phase adjuster for digitally adjusting the phase of a said servo pattern signal relative to a said clock signal so that a said servo pattern signal is in phase with a said clock signal.

The phase adjuster may be arranged to switch a said pattern frequency between one of a plurality of discrete values thereby to adjust the phase of a said servo pattern signal relative to a said clock signal.

The apparatus may comprise a digital phase locked loop for adjusting the phase of the servo pattern signal relative to the clock signal. The digital phase locked loop may include a dual-modulus prescalar.

The servo pattern signal generator may comprise two amplifiers, a phase separator or shifter for separating or shifting the outputs of the amplifiers in phase relative to each other, a summer for summing said phase separated outputs, and a gain controller for adjusting the gain of at least one of the amplifiers thereby to adjust the phase of said servo pattern signal.

According to a sixth aspect of the present invention, there is provided apparatus for writing a servo track to a storage medium having at least one clock track thereon which is used to control the phase of the servo track written to the storage medium, the apparatus comprising:

a servo pattern signal generator comprising two amplifiers, a phase separator or shifter for separating or shifting the outputs of the amplifiers in phase relative to each other, and a summer for summing said phase separated outputs;

a clock track reader for reading a clock track from said storage medium to obtain a clock signal having a clock frequency; and, a gain controller for adjusting the gain of at least one of the amplifiers thereby to adjust the phase of a said servo pattern signal relative to a said clock signal so that a said servo pattern signal is in phase with a said clock signal.

The gain of the amplifiers is preferably digitally controllable.

The phase by which the outputs of the phase shifters or phase splitter are separated or shifted relative to each other is preferably 90°.

Embodiments of the present invention will now be described by way of example with reference to the accompanying drawings, in which.

Figure 1:
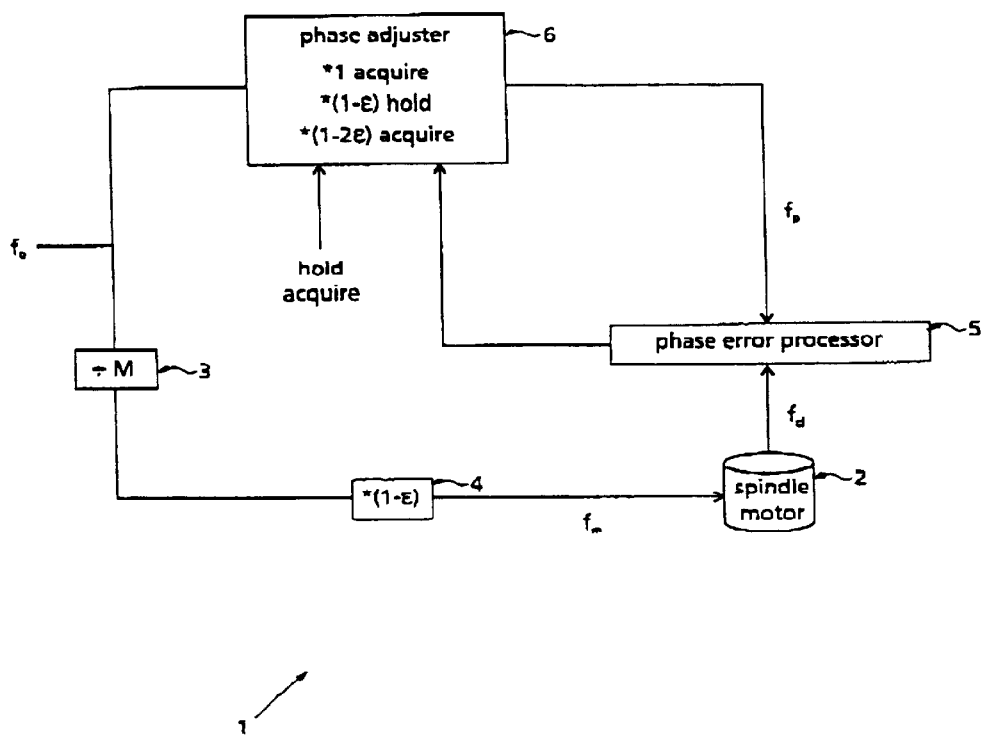
FIG. 1 is generalised block diagram of an embodiment of apparatus according to and for carrying out the present invention.

Referring to FIG. 1, there is shown a generalised block diagram of an embodiment of apparatus 1 according to and for carrying out the present invention. A spindle motor 2 is provided for causing rotation of a magnetic hard disk (not shown) to which servo information is to be written. The servo information is used when the hard disk is actually in use to enable a read/write head to locate data segments on the disk accurately and to remain on-track. The spindle motor 2 may be part of a head disk assembly, or part of a servo track writer in which the hard disk is mounted during servo track writing, or provided separately of the hard disk and the servo track writer.

The spindle motor 2 is driven with a frequency $f_m$. The motor frequency $f_m$ is obtained from a very high reference frequency $f_0$ by dividing that reference frequency $f_0$ by a factor of m by a divider 3. As will be discussed further below, the frequency $f_0/m$ is preferably reduced very slightly by an amount m by passing $f_0/m$ through a frequency converter 4 which multiplies $f_0/m$ by a factor of $(1-\epsilon)$. Thus, $fm=(f_0/m)(1-\epsilon)$. The reference frequency $f_0$ may be obtained from a crystal oscillator in manner well known in itself.

A clock track is written to the hard disk by any suitable arrangement. For example, the clock track may be of the conventional type mentioned above in which a separate clock head is used to write the clock track onto the disk and is then read back by the separate clock head. Alternatively, the clock track may be written by an internal read/write head associated with the hard disk (the so-called "product head") in any of the prior art arrangements mentioned above, or other arrangements not specifically mentioned herein, in which a dedicated clock head is not provided.

The clock track written on the hard disk is read back as the disk is rotated (whether by means of a dedicated clock head or by the product head) to provide a read-back clock frequency signal $f_{cl}$. The clock frequency $f_{cl}$ is passed to a phase error processor 5 which will be discussed in more detail below.

A servo pattern having a pattern frequency $f_p$ is generated to provide the servo pattern which is written across the hard disk during the servo track writing process. The pattern frequency $f_p$ is obtained from the same reference frequency $f_0$ from which the motor frequency $f_m$ is obtained. As is well known, it is necessary for the pattern frequency $f_p$ to have the same frequency and phase as the read back clock signal $f_{cl}$. To achieve this, the reference frequency $f_0$ is passed to a frequency converter or phase adjuster 6 which adjusts the phase of the input reference frequency $f_0$ in accordance with an output of the phase error processor 5 to provide a correctly phase-adjusted pattern frequency $f_p$ which is held through the period during which servo information is written to the hard disk. In practice, it is difficult to adjust the phase of a signal by advancing the signal. Accordingly, as mentioned above, the frequency $f_0/m$ initially obtained to provide the spindle motor frequency is reduced by a factor $(1-\epsilon)$, i.e. the motor 2 is slowed very slightly. Correspondingly, in the phase adjuster 6, the reference frequency $f_0$ is multiplied either by 1, $(1-\epsilon)$ or $(1-\epsilon)$, as required to hold the phase of the pattern frequency $f_p$, to acquire the phase of the clock frequency $f_{cl}$ by advancing the pattern frequency (i.e. speeding up the pattern frequency) or by acquiring the phase of the clock frequency $f_{cl}$ by retarding the phase of the pattern frequency $f_p$ (i.e. by temporarily slowing down the pattern frequency $f_p$), as indicated schematically in FIG. 1.

Figure 2:
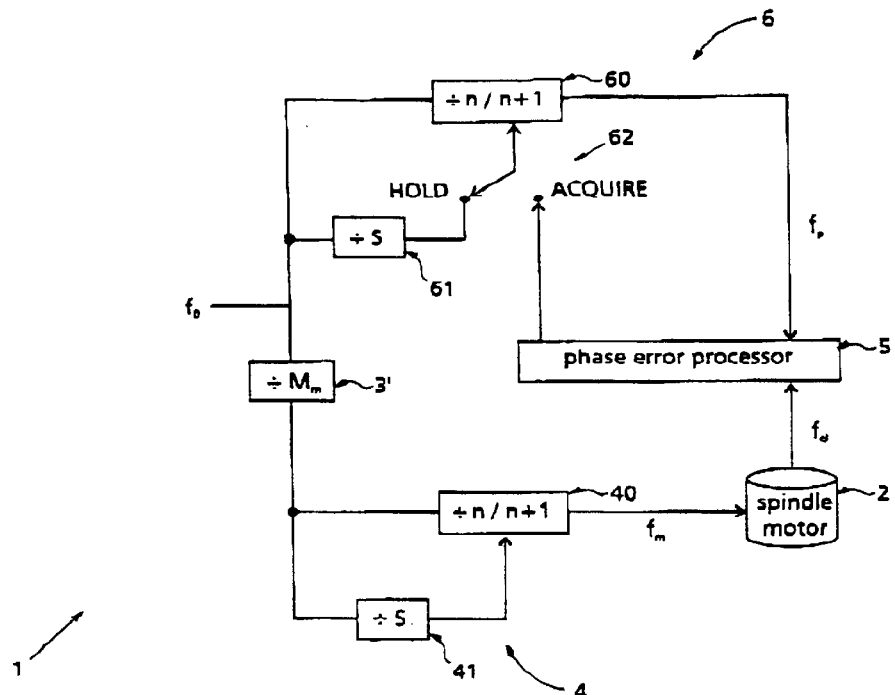
FIG. 2 is a block diagram of a specific embodiment of apparatus according to and for carrying out the present invention.

Referring to FIG. 2, there is shown a generalised block diagram of an embodiment of the apparatus 1 in which examples of circuits for modifying the reference frequency $f_0$ are shown schematically.

Referring first to the generation of the motor frequency $f_m$, in this example the reference frequency $f_0$ is passed to a divider 3' which divides the reference frequency by a factor $m_m$. The output of the divider 3' is split and a first portion sent to a digital down-converter 40 and a second portion to a steal circuit 41. The output of the steal circuit 41 is passed to a steal port or input of the down-converter 40. In a preferred embodiment, the down-converter 40 is a digital dual-modulus prescalar which divides the input frequency by a factor of n or n+1 according to the signal input to the steal input of the dual-modulus prescalar 40. In an example, n may be 8 or 12, with n+1 correspondingly being 9 or 13. The steal rate S of the steal circuit 41 is set in one example such that $1/1024$ of the frequency input to the down-converter 40 is passed to the steal input of the down-converter 40. The down-converter 40 reduces the input frequency by a factor of n at all times except when a signal is passed to the steal input, at which time the input frequency is reduced by a factor of n+1. Thus, the frequency of the signal input to the down-converter is reduced to (approximately) $1023/1024$ of the input value. Referring back briefly to FIG. 1, the motor frequency is thus reduced by a factor $(1-\epsilon)$ where, in the example just discussed with reference to FIG. 2, $\epsilon=1/1024$. Whilst it is believed that a dual-modulus prescalar has not been used previously for this application, dual-modulus prescalars are in themselves well known in other fields (including for example tuning circuits in satellite broadcast receivers and in mobile (cellular) telephones) and will therefore not be described in further detail herein.

Referring back to FIG. 2, a similar process is used to adjust the input reference frequency $f_0$ to generate the pattern frequency $f_p$. A digital down-converter 60, which is also preferably a digital dual-modulus prescalar with n the same as for the digital dual-modulus prescalar 40 for the motor frequency $f_m$, receives the reference frequency $f_0$ as an input. A portion of the reference frequency $f_0$ is passed to a steal circuit 61 which has the same steal cycle S as the corresponding circuit 41 used for the motor frequency $f_m$. The output of the steal circuit 61 can be selectively passed via a digital switch 62 to the steal input of the pattern frequency down-converter 60.

Assuming for the moment that the phase of the pattern frequency $f_p$ matches the phase of the clock frequency $f_{cl}$ as read back from the magnetic disk, then it is only necessary that the down-converter 60 be held, i.e. no phase adjustment forward or backwards relative to the clock signal is required and, instead, the phase can be held. In this case, the phase adjuster circuit 6 is operated on "HOLD" mode. In particular, the digital switch 62 is operated to pass the output of the steal circuit 61 to the down-converter 60. The steal rate S of the steal circuit 61 is set to be the same as for the steal circuit 41 of the motor part, i.e. $1/1024$ in the example described above. The frequency input to the down-converter 60 for generating the pattern frequency $f_p$ is thereby (further) reduced by exactly the same proportion as in the portion of the circuit that generates the motor frequency $f_m$ i.e. by a factor of $\epsilon=1/1024$ to $1023/1024$ in the specific example described above.

Assuming now that the phase error processor 5 detects a phase difference between the pattern frequency $f_p$ and the read back clock frequency $f_{cl}$, the digital switch 62 is operated so that the circuit can move to "ACQUIRE" mode. In the ACQUIRE mode, the phase error processor 5 passes a signal to the steal input of the pattern frequency down-converter 60 so that the frequency input to the down-converter 60 can be temporarily adjusted by a factor of either 0 or $1/512$ in the example described herein. In this way, the pattern frequency $f_p$ in the ACQUIRE mode can be multiplied by an additional factor of either $1022/1024$ or $1024/1024$, i.e. from a value above to a value below the spindle motor frequency $f_m \times m_m$.

In other words, the phase of the pattern frequency $f_p$ can be:

(i) advanced relative to the clock frequency $f_{cl}$ in ACQUIRE mode (a factor of 1 in the phase adjuster 6)

(ii) held relative to the clock frequency $f_{cl}$ (a factor of $(1-\epsilon)$ in the phase adjuster 6) in HOLD mode, or (iii) retarded relative to the clock frequency $f_{cl}$ in ACQUIRE mode (a factor of $(1-2\epsilon)$ in the phase adjuster 6).

It will be appreciated that the same frequency $f_0$ is used as the basis for generating both the motor frequency $f_m$ and the pattern frequency $f_p$ which means that the motor frequency $f_m$ and the pattern frequency $f_p$ are synchronised with each other (notwithstanding the different values used for $f_m$ and $f_p$). In this example, a high value for the reference frequency $f_0$ is used so that the motor frequency $f_m$ and the pattern frequency $f_p$ can each be generated by division processes alone. In addition to the main division ratios that are used to create the motor frequency $f_m$ and the pattern frequency $f_p$, the motor frequency $f_m$ is further lowered slightly so that all phase adjustments to the pattern frequency $f_p$ can be by retardations only. The phase shift is effectively achieved in the preferred embodiment described above by switching the generated pattern frequency between one of three discrete but closely matched values. The difficulties in the prior art systems mentioned above which use analogue phase locked loops are entirely overcome with the present invention as the combination of the phase error processor 5 and dual-modulus prescalar 60 acts as a digital phase locked loop. By way of example, typically f0 may be of the order of 0.8 GHz, $f_m$ may be of the order of 100 Hz and $f_p$ and $f_{cl}$ may be of the order of 100 MHz.

The dual modulus prescalars mentioned above as examples of the down-converters can be of any suitable form and may for example be constructed from discrete logic circuits or as an ASIC (application specific integrated circuit), optionally in combination with other digital components of the apparatus. Implementation of the dual modulus prescalars will be straightforward to those skilled in the art of such devices and therefore their construction and operation will not be described in further detail herein.

Figure 3:
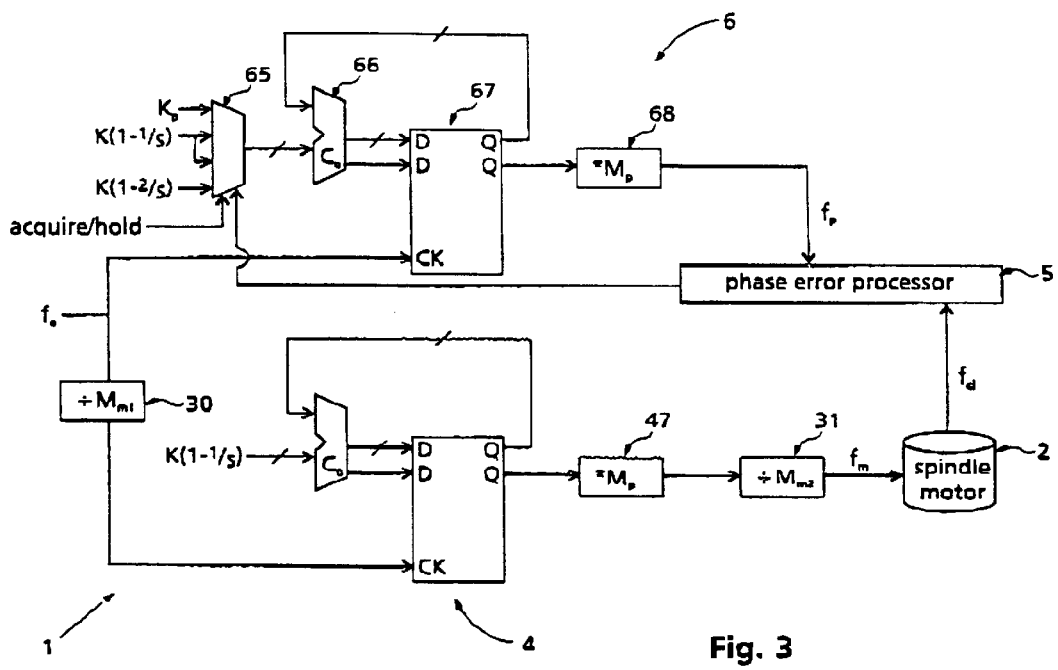
FIG. 3 is a block diagram of a second specific embodiment of apparatus according to and for carrying out the present invention.

An alternative arrangement for obtaining the pattern frequency $f_p$ and the motor frequency $f_m$ from a reference frequency $f_0$ is indicated schematically in FIG. 3. In this example, a relatively low value is used for the frequency of the reference frequency $f_0$ and that reference frequency is passed to a first fractional-n divider 4 acting as the frequency converter 4 for providing the motor frequency $f_m$ and also to a second fractional-n divider 6 acting as the frequency converter 6 for providing the pattern frequency $f_p$. The detailed operation of the circuits shown schematically in FIG. 3 will be well understood by those skilled in the art of such circuits which are in themselves known from other fields (including for example tuning circuits in satellite broadcast receivers and in mobile (cellular) telephones) and will not be described in detail.

Briefly, a digital mixer 65 receives a phase error signal from the phase error processor 5 and passes an inverted output to a digital adder 66, the inverted output being proportional to unity, (1−1/s) or (1−2/s) according to whether the phase of the pattern frequency $f_p$ needs to be advanced, held or retarded relative to the phase of the clock frequency $f_{cl}$. The digital adder 66 provides an output and an inverted output to a D-register 67 which also receives the reference frequency $f_0$ as an input clock signal. A first output of the D-register 67 is passed to an analogue phase locked loop 68 which is operated in its constant phase-lock mode in order to multiply the frequency received up to the value required for the pattern frequency $f_p$. A second, inverted output of the D-register 67 is passed back to the digital adder 66. The output of the D-register 67 is therefore the reference frequency $f_0$ but retarded or advanced in phase if required.

Similarly, the motor frequency $f_m$ is obtained from a similar arrangement in which the fractional-n divider 4 receives a signal proportional to (1−1/s) as an input so that the reference frequency $f_0$ is reduced by a small amount as in the example described with reference to FIG. 2. It will be seen that there are frequency dividers 30,31 in the circuit for the motor frequency $f_m$ in order to obtain the appropriate level for the motor frequency. Further, if the analogue phase locked loop 68 for the pattern frequency $f_p$ is of the fractional-n type, then a similar but lower frequency analogue phase locked loop 47 is preferably provided to obtain the motor frequency $f_m$.

In summary, in the example shown in FIG. 3, the same frequency $f_0$ is used as the basis for generating both the motor frequency $f_m$ and the pattern frequency $f_p$. The motor frequency $f_m$ is lowered slightly so that all phase adjustments to the pattern frequency $f_p$ can be by retardations only. Entirely digital devices are used to adjust the phase of the pattern frequency (it being understood that the analogue phase locked loops 67,47 are provided only as frequency multipliers).

Whilst the fractional-n dividers 4,6 are shown as discrete logic circuits in the drawings, they may instead be provided in an ASIC.

In the prior art systems in which a separate clock head is provided which always reads a dedicated clock track during servo track writing, and also in those prior art systems in which the servo tracks are generated from a previously written servo track, there are sometimes instances when the analogue phase locked loop of the prior art is held in a locked mode at the time the servo tracks are actually written because there are no other clock signals on the disk with which the phase of the servo track being written can be compared and aligned or to limit frequency changes when the servo tracks are being written. In other words, during the actual writing of the servo tracks in some systems, there will be times when the phase locked loop is necessarily locked at the last detected frequency and phase. This will also apply to certain applications of the present invention. For example, referring to FIG. 2, the digital phase locked loop 6 effectively provided by the dual-modulus prescalar 60 and phase error processor 5 can be held in a locked mode during the actual writing of the servo pattern. This corresponds to the digital switch 62 being switched to the "HOLD" in FIG. 2. However, in this condition, the dual-modulus prescalar 60 is still operated so that the instantaneous frequency is reduced periodically (for example every 1 in 1024 cycles) thereby normally to equal the disk speed×$m_m$. This means that there are occasional pulses in the servo pattern which are longer than the others by an amount equal to the step size achieved by the dual-modulus prescalar 60 (which may for example be 0.5 ns). This is effectively a source of jitter in a signal which is otherwise very stable and which can cause problems at high frequencies. In some circumstances, therefore, it is desirable to obtain the pattern frequency $f_p$ from the reference frequency $f_0$ digitally in a manner other than by a device (such as the dual-modulus prescalar 60 described above) which instantaneously or temporarily varies the frequency even in the HOLD mode.

Figure 4:
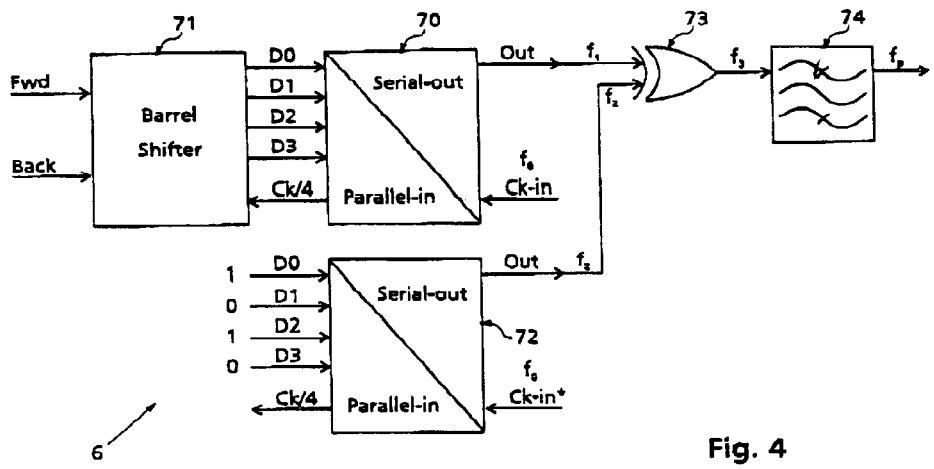
FIG. 4 is a block diagram of an alternative circuit for generating and adjusting the phase of the pattern frequency in the apparatus of FIG. 1.

An example of an alternative circuit for the phase adjuster 6 which can produce a jitter-free or substantially jitter-free pattern frequency when required (for example during times when the phase adjuster 6 is locked in a HOLD mode during servo track writing) is shown schematically in FIG. 4. In this example, the reference frequency $f_0$ is input to a 4-bit parallel-to-serial converter 70 which is fed by a 4-bit barrel shifter 71. This combination of the parallel-to-serial converter 70 and the barrel shifter 71 effectively operates as a divide-by-four circuit so that the output frequency $f_1$ from the parallel-to-serial converter 70 is ¼ of the input reference frequency $f_0$. However, in response to an advance or a retard command from the phase error processor 5 to the barrel shifter 71, the combination of the parallel-to-serial converter 70 and barrel shifter 71 can implement a single divide-by-three or divide-by-five cycle respectively. In other words, the circuit 6 shown in FIG. 4 can selectively advance and retard the signal phase in order that the phase of the pattern frequency $f_p$ can be adjusted to align with the clock signal read back from the disk. When the phase adjuster 6 of FIG. 4 is locked in its HOLD mode, advance or retard commands to the barrel shifter 71 can be inhibited so that the pattern frequency $f_p$ ultimately produced is entirely free of jitter. It should be noted that any shifts implemented by the barrel shifter 71 (to implement a divide-by-three or a divide-by-five or back to the divide-by-four) take place between load events in the parallel-to-serial converter 70 such that no sharp transitions or glitches take place in the frequency output $f_1$ by the parallel-to-serial converter 70.

The frequency $f_1$ which is output by the parallel-to-serial converter 70 can be stepped up or down in discrete intervals by an amount which is fixed for the particular components used and the value of the reference frequency $f_0$. In order to reduce the minimum step size that can be achieved, a second parallel-to-serial converter 72 can be added which receives the inverted reference frequency $f_0$ as its clock input and which divides that frequency by two. The output $f_2$ of the second parallel-to-serial converter 72 is passed with the output $f_1$ from the first parallel-toserial converter 70 to an exclusive-OR gate 73. This reduces the minimum step size that can be achieved.

In order to smooth the output $f_3$ from the exclusive-OR gate 73, an analogue band pass filter 74 may be provided after the exclusive-OR gate 73, particularly to filter out unwanted harmonics and therefore to minimise any peak-to-peak output jitter to provide a very smooth pattern frequency $f_p$. In a practical example, a minimum step size of 0.3 ns can be achieved.

It will be appreciated that the circuit of FIG. 4 can be implemented in an ASIC as well as by means of the discrete logic circuits 70–72, exclusive-OR gate 73 and band pass filter 74 shown in FIG. 4.

Figure 5:
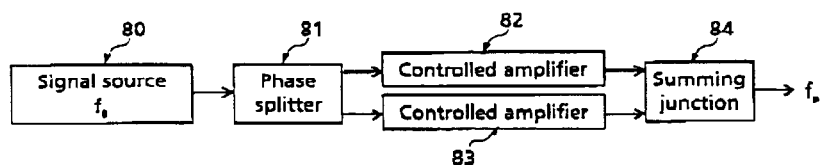
FIG. 5 is a block diagram of a further alternative circuit for generating and adjusting the phase the pattern frequency in the apparatus of FIG. 1; and, FIG. 6 is a block diagram of a yet further alternative circuit for generating and adjusting the phase the pattern frequency in the apparatus of FIG. 1.
Figure 6:
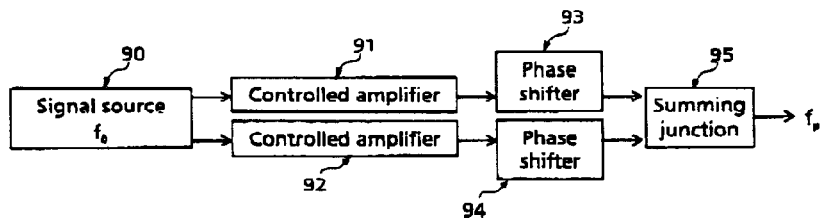

Further examples of alternative circuits for producing a jitter-free or substantially jitter-free pattern frequency when required are shown schematically in FIGS. 5 and 6.

Referring to FIG. 5, a signal source 80 provides the reference frequency $f_0$. For simplicity in this description, the reference frequency $f_0$ is considered to be a sine wave $a.\sin(\omega t)$. This signal is passed to a phase splitter 81 which provides two outputs separated in phase by 90°. These two outputs are therefore $b.\sin(\omega t)$ and $c.\cos(\omega t)$, where in general b and c may be different. These two outputs are passed to respective controlled digital amplifiers 82,83. The output from the first controlled amplifier 82 is $xb.\sin(\omega t)$ where x is the gain of the first controlled amplifier 82 and the output from the second controlled amplifier 83 is $yc.\cos(\omega t)$ where y is the gain of the second controlled amplifier 83. These two outputs are summed in a summing junction 84. The output of the summing junction 84 is therefore $f_p = xb.\sin(\omega t) + yc.\cos(\omega t)$ which can be rewritten as $f_p = g.\sin(\omega t + \phi)$ where the amplitude $g = ((xb)^2 + (yc)^2)^{1/2}$ and the phase angle $\phi = \tan^{-1}(yc/xb)$. It will be seen therefore that the circuit of FIG. 5 can provide a pattern frequency $f_p$ having the same frequency $\omega$ as the reference frequency $f_0$ but with a phase that can be varied at will between practically any desired value simply by varying the gain b,c of the first and second controlled amplifiers 82,83. It will be appreciated that it is desirable to keep the amplitude $g = ((xb)^2 + (yc)^2)^{1/2}$ constant. It will further be appreciated that the frequency output by the summing junction can be multiplied or divided as required. Filters may be added to remove any undesirable harmonics that may arise in the circuit. Frequency dependent errors that might arise in the phase splitter 81 can be compensated by appropriate control of the first and second controlled amplifiers 82,83.

The circuit shown in FIG. 6 is an alternative to the circuit shown in FIG. 5. The output signal $f_0$ from a signal source 90 is sent to two controlled amplifiers 91,92. The outputs of the controlled amplifiers are sent to respective phase shifters 93,94. The phase shifters 93,94 are set to give a 90° difference at their outputs, the outputs again being summed in a summing junction 95. As in the example shown in FIG. 5, appropriate control of the gain of the controlled amplifiers 91,92 allows the phase of the signal $f_p$ output by the summing junction 95 to be varied at will.

In each of the examples shown in FIGS. 5 and 6, the only limitation on the minimum step size that can be achieved for the phase shift is the degree to which the gain of the controlled amplifiers 82,83,91,92 can be varied. Exceedingly small time steps of for example 0.1 ns can be achieved, which allows the frequency used for the servo pattern to be increased compared to the value used in the prior art.

In summary, in the most preferred embodiment, a clocking method and apparatus for a rotating storage medium uses a single reference frequency from which both the pattern frequency of the servo pattern signal and the rotational frequency of the storage medium are derived. During the servo track writing process, a clock track is read from the storage medium to obtain a clock signal having a clock frequency, and the phase of the servo pattern signal is digitally adjusted relative to the clock signal so that the servo pattern signal is in phase with the clock signal. The servo pattern signal generator preferably includes two amplifiers, a phase separator or shifter for separating or shifting the outputs of the amplifiers in phase relative to each other, and a summer for summing said phase separated outputs. The gain of at least one of the amplifiers is adjusted to adjust the phase of the servo pattern signal relative to clock signal.

Embodiments of the present invention has been described with particular reference to the examples illustrated. However, it will be appreciated that variations and modifications may be made to the examples described within the scope of the present invention.

Reference is made to copending patent application numbers (1) and (2) each entitled "METHOD AND APPARATUS FOR WRITING CLOCK DATA TO A STORAGE MEDIUM" of even date, which are owned by the owner of the present application, and the entire contents of which are incorporated herein by reference.

What is claimed is:

1. A method of writing a servo track to a storage medium having at least one clock track thereon which is used to control the phase of the servo track written to the storage medium, the method comprising:

rotating a storage medium at a rotational frequency which is obtained from a reference frequency;

obtaining a servo pattern signal having a pattern frequency from said reference frequency;

reading a clock track from said storage medium to obtain a clock signal having a clock frequency;

adjusting the phase of the servo pattern signal relative to the clock signal by adjusting the phase of the reference frequency from which the servo pattern signal is obtained so that the servo pattern signal is in phase with the clock signal; and, writing a servo track in accordance with the servo pattern signal to the storage medium.

2. A method according to claim 1, wherein the phase of the servo pattern signal is digitally adjusted relative to the clock signal so that the servo pattern signal is in phase with the clock signal.

3. A method according to claim 2, comprising switching the pattern frequency between one of a plurality of discrete values thereby to adjust the phase of the servo pattern signal relative to the clock signal.

4. A method according to claim 2, wherein a digital phase locked loop is used to adjust the phase of the servo pattern signal relative to the clock signal.

5. A method of writing a servo track to a storage medium having at least one clock track thereon which is used to control the phase of the servo track written to the storage medium, the method comprising:

rotating a storage medium at a rotational frequency which is obtained from a reference frequency;

obtaining a servo pattern signal having a pattern frequency from said reference frequency;

reading a clock track from said storage medium to obtain a clock signal having a clock frequency;

digitally adjusting the phase of the servo pattern signal relative to the clock signal so that the servo pattern signal is in phase with the clock signal, the phase of the servo pattern being adjusted using a phase locked loop that includes a dual-modulus prescalar which is operated to adjust the phase of the servo pattern signal relative to the clock; and, writing a servo track in accordance with the servo pattern signal to the storage medium.

6. A method of writing a servo track to a storage medium having at least one clock track thereon which is used to control the phase of the servo track written to the storage medium, the method comprising:

rotating a storage medium at a rotational frequency which is obtained from a reference frequency;

obtaining a servo pattern signal having a pattern frequency from said reference frequency by passing a reference signal having the reference frequency to two amplifiers the outputs of which are separated or shifted in phase relative to each other and summing said outputs;

reading a clock track from said storage medium to obtain a clock signal having a clock frequency;

adjusting the phase of said servo pattern signal relative to the clock signal by adjusting the gain of at least one of the amplifiers so that the servo pattern signal is in phase with the clock signal; and, writing a servo track in accordance with the servo pattern signal to the storage medium.

7. A method of writing a servo track to a storage medium having at least one clock track thereon which is used to control the phase of the servo track written to the storage medium, the method comprising:

generating a servo pattern signal having a pattern frequency from a pattern frequency;

reading a clock track from said storage medium to obtain a clock signal having a clock frequency;

digitally adjusting the phase of the servo pattern signal relative to the clock signal by adjusting the phase of the reference frequency from which the servo pattern signal is obtained so that the servo pattern signal is in phase with the clock signal; and, writing a servo track in accordance with the servo pattern signal to the storage medium.

8. A method according to claim 7, comprising switching the pattern frequency between one of a plurality of discrete values thereby to adjust the phase of the servo pattern signal relative to the clock signal.

9. A method according to claim 7, wherein a digital phase locked loop is used to adjust the phase of the servo pattern signal relative to the clock signal.

10. A method of writing a servo track to a storage medium having at least one clock track thereon which is used to control the phase of the servo track written to the storage medium, the method comprising:

generating a servo pattern signal having a pattern frequency;

reading a clock track from said storage medium to obtain a clock signal having a clock frequency;

digitally adjusting the phase of the servo pattern signal relative to the clock signal so that the servo pattern signal is in phase with the clock signal, the phase of the servo pattern signal being adjusted using a digital phase locked loop that includes a dual-modulus prescalar which is operated to adjust the phase of the servo pattern signal relative to the clock signal; and, writing a servo track in accordance with the servo pattern signal to the storage medium.

11. A method of writing a servo track to a storage medium having at least one clock track thereon which is used to control the phase of the servo track written to the storage medium, the method comprising:

generating a servo pattern signal having a pattern frequency by passing a reference signal having the reference frequency to two amplifiers the outputs of which are separated or shifted in phase relative to each other and summing said phase separated outputs;

reading a clock track from said storage medium to obtain a clock signal having a clock frequency;

digitally adjusting the phase of the servo pattern signal relative to the clock signal so that the servo pattern signal is in phase with the clock signal by adjusting the gain of at least one of the amplifiers; and, writing a servo track in accordance with the servo pattern signal to the storage medium.

12. A method of writing a servo track to a storage medium having at least one clock track thereon which is used to control the phase of the servo track written to the storage medium, the method comprising:

generating a servo pattern signal having a pattern frequency from a reference signal by passing the reference signal to two amplifiers the outputs of which are separated or shifted in phase relative to each other and summing said outputs, the summed output being used to generate the servo pattern signal;

reading a clock track from said storage medium to obtain a clock signal having a clock frequency;

adjusting the phase of the servo pattern signal relative to the clock signal so that the servo pattern signal is in phase with the clock signal by adjusting the gain of at least one of the amplifiers; and, writing a servo track in accordance with the servo pattern signal to the storage medium.

13. A method according to claim 12, wherein the gain of the amplifiers is digitally controllable.

14. A method according to claim 12, wherein the phase by which the outputs of the amplifiers are separated or shifted relative to each other is 90°.

15. Apparatus for writing a servo track to a storage medium having at least one clock track thereon which is used to control the phase of the servo track written to the storage medium, the apparatus comprising:

a source of a reference signal having a reference frequency;

a drive circuit arranged to cause rotation of the storage medium at a rotational frequency which is obtained from the reference frequency;

a servo pattern signal generator arranged to receive the reference frequency and to output a servo pattern signal having a pattern frequency obtained from the reference frequency for use in writing a servo track on said storage medium; and, a phase adjuster for adjusting the phase of the servo pattern signal to be in phase with a clock signal obtained from a clock track on a said storage medium by adjusting the phase of the reference frequency from which the servo pattern signal is obtained.

16. Apparatus according to claim 15, wherein said phase adjuster is a digital phase adjuster.

17. Apparatus according to claim 16, wherein the digital phase adjuster is arranged to adjust the phase of the servo pattern signal relative to the clock signal by switching the pattern frequency between one of a plurality of discrete values.

18. Apparatus according to claim 16, wherein said phase adjuster is a digital phase locked loop.

19. Apparatus for writing a servo track to a storage medium having at least one clock track thereon which is used to control the phase of the servo track written to the storage medium, the apparatus comprising:
- a source of a reference signal having a reference frequency;
- a drive circuit arranged to cause rotation of the storage medium at a rotational frequency which is obtained from the reference frequency;
- a servo pattern signal generator arranged to receive the reference frequency and to output a servo pattern signal having a pattern frequency obtained from the reference frequency for use in writing a servo track on said storage medium; and,
- a digital phase locked loop for adjusting the phase of the servo pattern signal to be in phase with a clock signal obtained from a clock track on a said storage medium, wherein the digital phase locked loop includes a dual-modulus prescalar.

20. Apparatus according to claim 19, wherein said dual-modulus prescalar also forms part of the servo pattern signal generator.

21. Apparatus for writing a servo track to a storage medium having at least one clock track thereon which is used to control the phase of the servo track written to the storage medium, the apparatus comprising:
- a source of a reference signal having a reference frequency;
- a drive circuit arranged to cause rotation of the storage medium at a rotational frequency which is obtained from the reference frequency;
- a servo pattern signal generator arranged to receive the reference frequency and to output a servo pattern signal having a pattern frequency obtained from the reference frequency for use in writing a servo track on said storage medium; and,
- a phase adjuster for adjusting the phase of the servo pattern signal to be in phase with a clock signal obtained from a clock track on a said storage medium, wherein the phase adjuster comprises two amplifiers, a phase separator or shifter for separating or shifting the outputs of the amplifiers in phase relative to each other, a summer for summing said phase separated outputs, and a gain controller for adjusting the gain of at least one of the amplifiers thereby to adjust the phase of said servo pattern signal.

22. Apparatus for writing a servo track to a storage medium having at least one clock track thereon which is used to control the phase of the servo track written to the storage medium, the apparatus comprising:
- a source of a reference signal having a reference frequency;
- a drive circuit arranged to cause rotation of the storage medium at a rotational frequency which is obtained from the reference frequency;
- a servo pattern signal generator arranged to receive the reference frequency and to output a servo pattern signal having a pattern frequency obtained from the reference frequency for use in writing a servo track on said storage medium; and,
- a phase adjuster for adjusting the phase of the servo pattern signal to be in phase with a clock signal obtained from a clock track on a said storage medium, the phase adjuster comprising a dual-modulus prescalar.

23. Apparatus for writing a servo track to a storage medium having at least one clock track thereon which is used to control the phase of the servo track written to the storage medium, the apparatus comprising:
- a servo pattern signal generator for generating a servo pattern signal having a pattern frequency from a reference frequency;
- a clock track reader for reading a clock track from a storage medium to obtain a clock signal having a clock frequency; and,
- a digital phase adjuster for digitally adjusting the phase of a said servo pattern signal relative to a said clock signal so that a said servo pattern signal is in phase with a said clock signal by adjusting the phase of the reference frequency from which the servo pattern signal is obtained.

24. Apparatus according to claim 23, wherein the phase adjuster is arranged to switch a said pattern frequency between one of a plurality of discrete values thereby to adjust the phase of a said servo pattern signal relative to a said clock signal.

25. Apparatus according to claim 23, comprising a digital phase locked loop for adjusting the phase of the servo pattern signal relative to the clock signal.

26. Apparatus for writing a servo track to a storage medium having at least one clock track thereon which is used to control the phase of the servo track written to the storage medium, the apparatus comprising:
- a servo pattern signal generator for generating a servo pattern signal having a pattern frequency;
- a clock track reader for reading a clock track from a storage medium to obtain a clock signal having a clock frequency; and,
- a digital phase locked loop for digitally adjusting the phase of a said servo pattern signal relative to a said clock signal so that a said servo pattern signal is in phase with a said clock signal, wherein the digital phase locked loop includes a dual-modulus prescalar.

27. Apparatus for writing a servo track to a storage medium having at least one clock track thereon which is used to control the phase of the servo track written to the storage medium, the apparatus comprising:
- a servo pattern signal generator for generating a servo pattern signal having a pattern frequency;
- a clock track reader for reading a clock track from a storage medium to obtain a clock signal having a clock frequency; and,
- a digital phase adjuster for digitally adjusting the phase of a said servo pattern signal relative to a said clock signal so that a said servo pattern signal is in phase with a said clock signal,
- wherein the servo pattern signal generator comprises two amplifiers, a phase separator or shifter for separating or shifting the outputs of the amplifiers in phase relative to each other, a summer for summing said phase separated outputs, and a gain controller for adjusting the gain of at least one of the amplifiers thereby to adjust the phase of said servo pattern signal.

28. Apparatus for writing a servo track to a storage medium having at least one clock track thereon which is used to control the phase of the servo track written to the storage medium, the apparatus comprising:
- a servo pattern signal generator comprising two amplifiers, a phase separator or shifter for separating or shifting the outputs of the amplifiers in phase relative to each other, and a summer for summing said phase separated outputs;
- a clock track reader for reading a clock track from said storage medium to obtain a clock signal having a clock frequency; and,
- a gain controller for adjusting the gain of at least one of the amplifiers thereby to adjust the phase of a said servo pattern signal relative to a said clock signal so that a said servo pattern signal is in phase with a said clock signal.

29. Apparatus according to claim 28, wherein the gain of the amplifiers is digitally controllable.

30. Apparatus according to claim 28, wherein the phase by which the outputs of the phase shifters or phase splitter are separated or shifted relative to each other is 90°.

* * * * *

UNITED STATES PATENT AND TRADEMARK OFFICE
CERTIFICATE OF CORRECTION

PATENT NO. : 6,674,593 B2
DATED : January 6, 2004
INVENTOR(S) : Jolly et al.

It is certified that error appears in the above-identified patent and that said Letters Patent is hereby corrected as shown below:

Column 7,
Line 25, please change the second occurrence of "$(1-\varepsilon)$" to read -- $(1-2\varepsilon)$ --

Column 9,
Line 63, please change "67" to read -- 68 --

Column 13,
Line 38, the wording "from a pattern frequency" should read -- from a reference frequency --

Signed and Sealed this

Twenty-eighth Day of December, 2004

JON W. DUDAS
*Director of the United States Patent and Trademark Office*